United States Patent
Ando et al.

(10) Patent No.: US 6,861,000 B2
(45) Date of Patent: *Mar. 1, 2005

(54) RUNNING METHOD AND WASHING METHOD FOR SPIRAL WOUND MEMBRANE ELEMENT AND SPIRAL WOUND MEMBRANE MODULE

(75) Inventors: Masaaki Ando, Ibaraki (JP); Satoru Ishihara, Ibaraki (JP); Katsumi Ishii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 393 days.

This patent is subject to a terminal disclaimer.

(21) Appl. No.: 09/907,994

(22) Filed: Jul. 18, 2001

(65) Prior Publication Data

US 2002/0027103 A1 Mar. 7, 2002

(30) Foreign Application Priority Data

Jul. 19, 2000 (JP) ........................... 2000-219450
Jul. 10, 2001 (JP) ........................... 2001-208921

(51) Int. Cl.[7] ............................. B01D 61/00; C02F 1/44
(52) U.S. Cl. ............ 210/650; 210/321.74; 210/321.84; 210/321.76; 210/333.1; 210/333.01
(58) Field of Search ..................... 210/636, 321.76, 210/321.83, 321.74, 650, 333.1, 333.01

(56) References Cited

U.S. PATENT DOCUMENTS

| | | | |
|---|---|---|---|
| 5,843,351 A | * | 12/1998 | Hirose et al. |
| 6,024,873 A | * | 2/2000 | Hirose et al. |
| 6,190,557 B1 | * | 2/2001 | Hisada et al. |
| 6,402,956 B1 | * | 6/2002 | Andou et al. |
| 6,432,310 B1 | * | 8/2002 | Andou et al. |
| 6,533,937 B1 | * | 3/2003 | Adachi et al. |

FOREIGN PATENT DOCUMENTS

| | | |
|---|---|---|
| EP | 1 022 052 A2 | 7/2000 |
| JP | 6-98276 A | 12/1994 |
| JP | 10 225626 A | 8/1998 |
| JP | 10-225626 A | 8/1998 |
| JP | 2000-271456 A | 10/2000 |
| JP | 2001-113140 A | 4/2001 |
| JP | 2001 179058 A | 7/2001 |

* cited by examiner

*Primary Examiner*—Ana Fortuna
(74) *Attorney, Agent, or Firm*—Akin, Gump, Strauss, Hauer & Feld LLP

(57) ABSTRACT

A spiral wound membrane module comprises a spiral wound membrane element including a separation membrane having high back pressure strength. The flow rate of permeate in filtration of the spiral wound membrane element is preferably set to 0.5 to 2.0 m$^3$/m$^2$/day, and the filtration time is preferably set to 10 to 300 minutes. The flow rate of wash water in washing is preferably set to 1.0 to 4.0 m$^3$/m$^2$/day, and the washing time is preferably set to 10 to 300 seconds. In such ranges, the ratio of the permeate volume in filtration to the permeate volume in back wash reverse filtration is set to be not more than 600.

22 Claims, 7 Drawing Sheets

F I G. 5
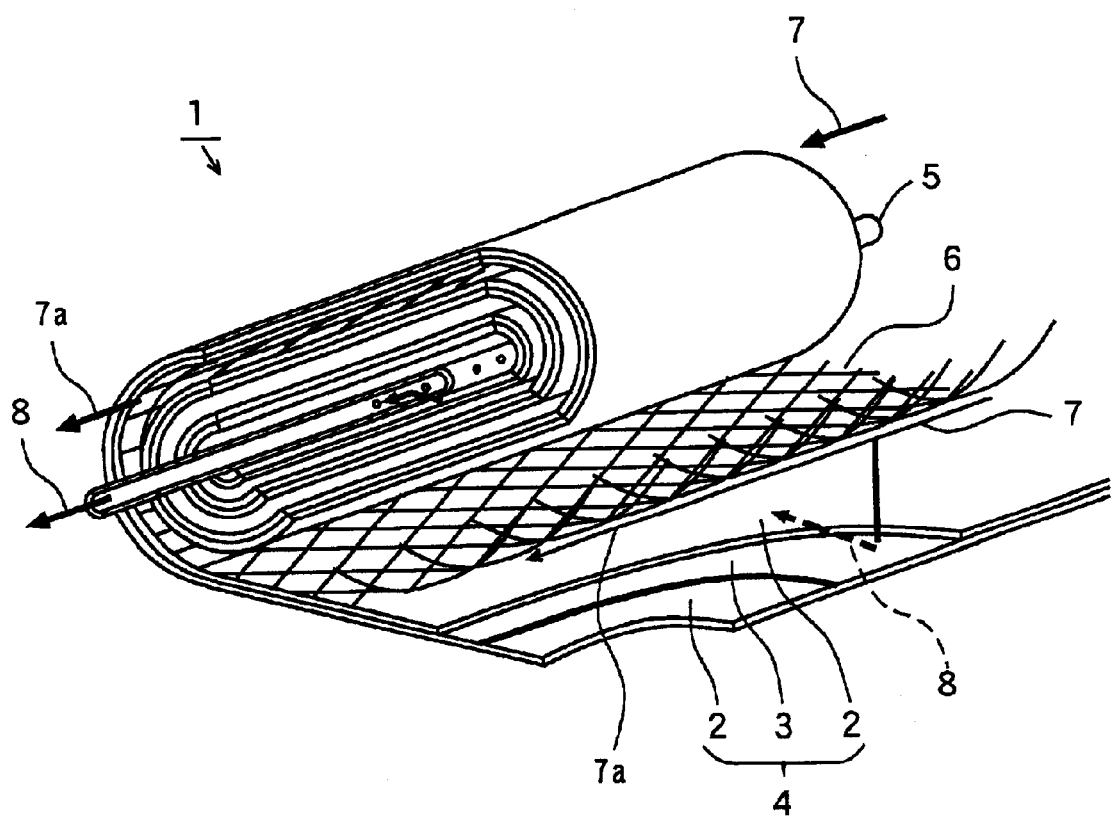

RUNNING METHOD AND WASHING METHOD FOR SPIRAL WOUND MEMBRANE ELEMENT AND SPIRAL WOUND MEMBRANE MODULE

BACKGROUND OF THE INVENTION

1. Field of the Invention

The present invention relates to a running method and a washing method for a spiral wound membrane element and a spiral wound membrane module employed for a membrane separator such as a reverse osmosis membrane separator, an ultrafiltration membrane separator or a microfiltration membrane separator.

2. Description of the Prior Art

Application of membrane separation is recently spread to water purification and waste water treatment, so that membrane separation is applied to hardly treatable liquid quality. In particular, recovery and recycling of industrial waste water through membrane separation is strongly demanded.

A hollow fiber membrane element is generally employed for such membrane separation in consideration of the membrane area (volumetric efficiency) per unit volume. However, the membrane of the hollow fiber membrane element is readily broken, and raw water is disadvantageously mixed into permeate to reduce separation performance when the membrane is broken.

Therefore, application of a spiral wound membrane element in place of the hollow fiber membrane element is proposed. The spiral wound membrane element can advantageously provide a large membrane area per unit volume similarly to the hollow fiber membrane element and maintain separation performance, and has high reliability.

When waste water containing a large amount of suspended, colloidal or dissolved matter is subjected to membrane separation, the suspended, colloidal or dissolved matter is deposited on a membrane surface as contaminants to reduce the water permeation velocity. Particularly in dead end filtration, contaminants are so readily deposited on the membrane surface that the water permeation velocity is remarkably reduced and it is difficult to continue stable filtration running.

In order to prevent the membrane surface from deposition of contaminants, cross flow filtration is performed. In this cross flow filtration, raw water is fed in parallel with the membrane surface for preventing the membrane surface from deposition of contaminants through shearing force caused on the interface between the membrane surface and fluid. In such cross flow filtration, a sufficient membrane surface linear velocity must be obtained for preventing the membrane surface from deposition of contaminants, and hence a sufficient flow rate of raw water must be fed in parallel with the membrane surface. When the flow rate of the raw water fed in parallel with the membrane surface is increased, however, the recovery per spiral wound membrane element is reduced and a large pump is required for feeding the raw water, while the system cost is remarkably increased.

On the other hand, contaminants deposited on the membrane surface may be removed by back wash reverse filtration. This back wash reverse filtration is generally performed in a hollow fiber membrane element.

For example, Japanese Patent Publication No. 6-98276 (1994) proposes application of back wash reverse filtration to a spiral wound membrane element. However, back pressure strength of a separation membrane of a conventional spiral wound membrane element is so low that the separation membrane may be broken when subjected to a back pressure in back wash reverse filtration. Therefore, the aforementioned gazette states that the spiral wound membrane element is preferably subjected to back wash reverse filtration with a low back pressure of 0.1 to 0.5 $kgf/cm^2$ (0.01 to 0.05 MPa).

According to an experiment made by the inventor, however, it was difficult to sufficiently remove contaminants when a spiral wound membrane element was subjected to back wash reverse filtration with such a back pressure, and it was impossible to maintain a high permeate flux over a long period.

The inventor has proposed a structure of and a method of preparing a separation membrane having back pressure strength of at least 2 $kgf/cm^2$ in Japanese Patent Laying-Open No. 10-225626 (1998). However, it has not yet been sufficiently verified in relation to a spiral wound membrane element prepared with the separation membrane having such back pressure strength as to the level of a back pressure enabling back wash reverse filtration in practice and the range of the back pressure for back wash reverse filtration enabling the spiral wound membrane element to maintain a high permeate flux over a long period. Further, no verification has been made on a method of running a spiral wound membrane element including the aforementioned separation membrane having high back pressure strength and a method of running a spiral wound membrane module comprising such a spiral wound membrane element.

Also when the separation membrane having high back pressure strength is employed, stable filtration running cannot be continuously performed in a spiral wound membrane element and a spiral wound membrane module without reducing the permeate flux over a long period unless optimum washing conditions and an optimum washing method are applied and the filtration running is performed by an optimum method.

SUMMARY OF THE INVENTION

An object of the present invention is to provide a running method and a washing method for a spiral wound membrane element and a spiral wound membrane module capable of stable filtration running at a low cost while maintaining a high permeate flux over a long period.

According to an aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises steps of feeding a raw liquid from an end of the spiral wound membrane element and taking out a permeated liquid from at least one opening end of the perforated hollow pipe in running, introducing a washing liquid from at least one opening end of the perforated hollow pipe and discharging the washing liquid from at least one end of the spiral wound membrane element thereby performing back wash reverse filtration on the separation membrane with a back pressure higher than 0.05 MPa and not more than 0.3 MPa in washing, and setting the ratio of the amount of the permeated liquid permeated through the separation membrane in a running period to the amount of the washing liquid permeated through the separation membrane in a washing period to not more than 600.

According to this method of running a spiral wound membrane element, the raw liquid is fed from an end of the spiral wound membrane element, to be subjected to filtration. In this case, the membrane surface of the spiral wound membrane element captures contaminants.

In washing, the washing liquid is introduced from at least one opening end of the perforated hollow pipe. The washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

The separation membrane can be prevented from application of an excessive load, contaminants adhering to the separation membrane can be removed by sufficient washing, and stable running can be performed with high filtration efficiency continuously over a long period by setting the ratio of the amount of the permeated liquid permeated through the separation membrane in the running period to the amount of the washing liquid permeated through the separation membrane in the washing period to not more than 60.

According to the aforementioned method of running a spiral wound membrane element, as hereinabove described, filtration can be so stably performed that the permeated liquid can be efficiently obtained. Further, no large pump is required for feeding the raw liquid but the scale of the system can be reduced. Thus, the system cost is reduced.

The raw liquid is preferably fed so that the flow rate of the permeated liquid in filtration is at least 0.5 m$^3$/m$^2$/day and not more than 4.0 m$^3$/m$^2$/day, and the filtration time is preferably set to at least 10 minutes and not more than 300 minutes. Further, the washing liquid is preferably introduced into the perforated hollow pipe so that the flow rate of the washing liquid in washing is at least 1.0 m$^3$/m$^2$/day and not more than 4.0 m$^3$/m$^2$/day, and the washing time is preferably set to at least 10 seconds and not more than 300 seconds.

Within such ranges, the flow rate of the permeated liquid in filtration, the filtration time, the flow rate of the washing liquid in washing and the washing time are so set that the ratio of the amount of the permeated liquid permeated through the separation membrane in the running period to the amount of the washing liquid permeated through the separation membrane in the washing period is not more than 600.

In particular, the raw liquid is more preferably fed so that the flow rate of the permeated liquid in filtration is at least 0.5 m$^3$/m$^2$/day and not more than 2.0 m$^3$/m$^2$/day, and the filtration time is more preferably set to at least 10 minutes and not more than 60 minutes. Further, the washing liquid is more preferably introduced into the perforated hollow pipe so that the flow rate of the washing liquid in washing is at least 1.0 m$^3$/m$^2$/day and not more than 3.0 m$^3$/m$^2$/day, and the washing time is more preferably set to at least 30 seconds and not more than 60 seconds.

In this case, the ratio of the amount of the permeated liquid permeated through the separation membrane in the running period to the amount of the washing liquid permeated through the separation membrane in the washing period is not more than 240.

In particular, the raw liquid is more preferably fed so that the flow rate of the permeated liquid in filtration is at least 0.5 m$^3$/m$^2$/day and not more than 2.0 m$^3$/m$^2$/day, and the filtration time is more preferably set to at least 10 minutes and not more than 30 minutes. Further, the washing liquid is more preferably introduced into the perforated hollow pipe so that the flow rate of the washing liquid in washing is at least 1.0 m$^3$/m$^2$/day and not more than 3.0 m$^3$/m$^2$/day, and the washing time is more preferably set to at least 30 seconds and not more than 60 seconds.

In this case, the ratio of the amount of the permeated liquid permeated through the separation membrane in the running period to the amount of the washing liquid permeated through the separation membrane in the washing period is not more than 120.

The separation membrane can be prevented from application of an excessive load and deposition of contaminants on the membrane surface is suppressed so that stable running can be performed continuously over a long period by setting the flow rate of the permeated liquid in filtration and the filtration time as described above. Further, the target permeate flow rate can be efficiently obtained.

In addition, contaminants adhering to the membrane surface can be sufficiently separated for performing stable running continuously over a long period and suppressing reduction of filtration efficiency by setting the flow rate of the washing liquid in washing and the washing time as described above.

A permeated liquid may be employed as the washing liquid.

The separation membrane may be formed by bonding a permeable membrane body to a surface of a porous sheet member, and the permeable membrane body may be bonded to the surface of the porous sheet member in an anchored state.

In such a separation membrane, bonding between the porous sheet member and the permeable membrane body is so reinforced as to improve back pressure strength of the separation membrane. Thus, sufficient back wash reverse filtration can be performed with a back pressure higher than 0.05 MPa and not more than 0.3 MPa without breaking the separation membrane of the spiral wound membrane element.

In particular, the back pressure strength of the separation membrane is preferably at least 0.2 MPa. Thus, back wash reverse filtration with a high back pressure is so enabled that stable membrane separation can be performed over a long period by sufficiently washing the separation membrane.

In particular, the porous sheet member is preferably made of woven fabric, nonwoven fabric, a mesh net or a foaming sintered sheet of synthetic resin.

Further, the porous sheet member is preferably made of nonwoven fabric having a thickness of at least 0.08 mm and not more than 0.15 mm and density of at least 0.5 g/cm$^3$ and not more than 0.8 g/cm$^3$.

Thus, back pressure strength of at least 0.2 MPa can be obtained, and increase of permeation resistance and separation of the permeable membrane body can be prevented while ensuring strength for serving as a reinforcing sheet.

According to another aspect of the present invention, a method of washing a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises steps of taking out a permeated liquid by filtration and thereafter introducing a washing liquid from at least one opening end of the perforated hollow pipe and discharging the washing liquid from at least one end of the spiral wound membrane element thereby performing back wash reverse filtration on the separation membrane with a back pressure higher than 0.05 MPa and not more than 0.3 MPa, and setting the ratio of the amount of the permeated liquid permeated through the separation membrane in filtration to the amount of the washing liquid permeated through the separation membrane in washing to not more than 600.

In the aforementioned spiral wound membrane element, the raw liquid can be fed from an end of the spiral wound membrane element to be subjected to filtration. In this case, the membrane surface of the spiral wound membrane element captures contaminants.

In washing, the washing liquid is introduced from at least one opening end of the perforated hollow pipe. The washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

The separation membrane can be prevented from application of an excessive load and contaminants adhering to the outer periphery can be removed by sufficient washing so that stable running can be performed continuously over a long period with high filtration efficiency by setting the ratio of the amount of the permeated liquid permeated through the separation membrane in filtration to the amount of the washing liquid permeated through the separation membrane in washing to not more than 600.

According to the aforementioned method of running a spiral wound membrane element, as hereinabove described, filtration can be so stably performed that the permeated liquid can be efficiently obtained. Further, no large pump is required for feeding the raw liquid but the scale of the system can be reduced. Thus, the system cost is reduced.

When the raw liquid is fed so that the flow rate of the permeated liquid in filtration is at least 0.5 $m^3/m^2/day$ and not more than 4.0 $m^3/m^2/day$ and the filtration time is set to at least 10 minutes and not more than 300 minutes, the washing liquid is preferably introduced into the perforated hollow pipe so that the flow rate of the washing liquid in washing is at least 1.0 $m^3/m^2/day$ and not more than 4.0 $m^3/m^2/day$ and the washing time is preferably set to at least 10 seconds and not more than 300 seconds.

Particularly when the raw liquid is fed so that the flow rate of the permeated liquid in filtration is at least 0.5 $m^3/m^2/day$ and not more than 2.0 $m^3/m^2/day$ and the filtration time is set to at least 10 minutes and not more than 60 minutes, the washing liquid is more preferably introduced into the perforated hollow pipe so that the flow rate of the washing liquid in washing is at least 1.0 $m^3/m^2/day$ and not more than 3.0 $m^3/m^2/day$, the washing time is more preferably set to at least 30 seconds and not more than 60 seconds, and the ratio of the amount of the permeated liquid permeated through the separation membrane in filtration to the amount of the washing liquid permeated through the separation membrane in washing is more preferably set to not more than 240.

Particularly when the raw liquid is fed so that the flow rate of the permeated liquid in filtration is at least 0.5 $m^3/m^2/day$ and not more than 2.0 $m^3/m^2/day$ and the filtration time is set to at least 10 minutes and not more than 30 minutes, the washing liquid is more preferably introduced into the perforated hollow pipe so that the flow rate of the washing liquid in washing is at least 1.0 $m^3/m^2/day$ and not more than 3.0 $m^3/m^2/day$, the washing time is more preferably set to at least 30 seconds and not more than 60 seconds, and the ratio of the amount of the permeated liquid permeated through the separation membrane in filtration to the amount of the washing liquid permeated through the separation membrane in washing is more preferably set to not more than 120.

Thus, contaminants adhering to the membrane surface can be sufficiently separated, stable running can be performed continuously over a long period, and reduction of filtration efficiency can be suppressed.

According to still another aspect of the present invention, a method of running a spiral wound membrane module, comprising a pressure vessel having a raw liquid inlet and one or a plurality of spiral wound membrane elements stored in the pressure vessel with each spiral wound membrane element comprising a perforated hollow pipe and an envelope separation membrane wound on the outer peripheral surface of the perforated hollow pipe and allowing back wash reverse filtration with a back pressure higher than 0.05 MPa and not more than 0.3 MPa, comprises steps of feeding a raw liquid from an end of the spiral wound membrane element through the raw liquid inlet of the pressure vessel and taking out a permeated liquid from at least one opening end of the perforated hollow pipe in running, introducing a washing liquid from at least one opening end of the perforated hollow pipe and discharging the washing liquid from at least one end of the spiral wound membrane element for taking out the washing liquid from the pressure vessel in washing thereby performing back wash reverse filtration on the separation membrane with a back pressure higher than 0.05 MPa and not more than 0.3 MPa, and setting the ratio of the amount of the permeated liquid permeated through the separation membrane in a running period to the amount of the washing liquid permeated through the separation membrane in a washing period to not more than 600.

According to this method of running a spiral wound membrane module, the raw liquid is fed from an end of the spiral wound membrane element in running, to be subjected to filtration. In this case, the membrane surface of the spiral wound membrane element captures contaminants.

In washing, the washing liquid introduced from at least one opening end of the perforated hollow pipe is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

Further, the separation membrane can be prevented from application of an excessive load and contaminants adhering to the membrane surface can be removed by sufficient washing so that stable running can be performed with high filtration efficiency continuously over a long period by setting the ratio of the amount of the permeated liquid permeated through the separation membrane in the running period to that of the washing liquid permeated through the separation membrane in the washing period to not more than 600.

According to the aforementioned method of running a spiral wound membrane module, as hereinabove described, dead end filtration can be so stably performed that the permeated liquid can be efficiently obtained. Further, no large pump is required for feeding the raw liquid but the scale of the system can be reduced. Thus, the system cost is reduced.

The raw liquid is preferably fed so that the flow rate of the permeated liquid in filtration is at least 0.5 $m^3/m^2/day$ and not more than 4.0 $m^3/m^2/day$, and the filtration time is preferably set to at least 10 minutes and not more than 300 minutes. Further, the washing liquid is preferably introduced into the perforated hollow pipe so that the flow rate of the washing liquid in washing is at least 1.0 $m^3/m^2/day$ and not more than 4.0 $m^3/m^2/day$, and the washing time is preferably set to at least 10 seconds and not more than 300 seconds.

Within such ranges, the flow rate of the permeated liquid in filtration, the filtration time, the flow rate of the washing liquid in washing and the washing time are so set that the ratio of the amount of the permeated liquid permeated through the separation membrane in the running period to the amount of the washing liquid permeated through the separation membrane in the washing period is not more than 600.

In particular, the raw liquid is more preferably fed so that the flow rate of the permeated liquid in filtration is at least 0.5 $m^3/m^2/day$ and not more than 2.0 $m^3/m^2/day$, and the filtration time is more preferably set to at least 10 minutes and not more than 60 minutes. Further, the washing liquid is more preferably introduced into the perforated hollow pipe so that the flow rate of the washing liquid in washing is at least 1.0 $m^3/m^2/day$ and not more than 3.0 $m^3/m^2/day$, and the washing time is more preferably set to at least 30 seconds and not more than 60 seconds. In this case, the ratio of the amount of the permeated liquid permeated through the separation membrane in the running period to the amount of the washing liquid permeated through the separation membrane in the washing period is not more than 240.

In particular, the raw liquid is more preferably fed so that the flow rate of the permeated liquid in filtration is at least 0.5 $m^3/m^2/day$ and not more than 2.0 $m^3/m^2/day$, and the filtration time is more preferably set to at least 10 minutes and not more than 30 minutes. Further, the washing liquid is more preferably introduced into the perforated hollow pipe so that the flow rate of the washing liquid in washing is at least 1.0 $m^3/m^2/day$ and not more than 3.0 $m^3/m^2/day$, and the washing time is more preferably set to at least 30 seconds and not more than 60 seconds. In this case, the ratio of the amount of the permeated liquid permeated through the separation membrane in the running period to the amount of the washing liquid permeated through the separation membrane in the washing period is not more than 120.

The separation membrane can be prevented from application of an excessive load and deposition of contaminants on the membrane surface is suppressed so that stable running can be performed continuously over a long period by setting the flow rate of the permeated liquid in filtration and the filtration time as described above. Further, the target permeate flow rate can be efficiently obtained. In this case, the ratio of the amount of the permeated liquid permeated through the separation membrane in the running period to the amount of the washing liquid permeated through the separation membrane in the washing period is not more than 120.

Further, contaminants adhering to the membrane surface can be sufficiently separated for performing stable running continuously over a long period and suppressing reduction of filtration efficiency by setting the flow rate of the washing liquid in washing and the washing time as described above.

According to a further aspect of the present invention, a method of washing a spiral wound membrane module, comprising a pressure vessel and one or a plurality of spiral wound membrane elements stored in the pressure vessel with each spiral wound membrane element comprising a perforated hollow pipe and an envelope separation membrane wound on the outer peripheral surface of the perforated hollow pipe and allowing back wash reverse filtration with a back pressure higher than 0.05 MPa and not more than 0.3 MPa, comprises steps of taking out a permeated liquid by filtration and thereafter introducing a washing liquid from at least one opening end of the perforated hollow pipe and discharging the washing liquid from at least one end of the spiral wound membrane element for taking out the washing liquid from the pressure vessel thereby performing back wash reverse filtration on the separation membrane with a back pressure higher than 0.05 MPa and not more than 0.3 MPa, and setting the ratio of the amount of the permeated liquid permeated through the separation membrane in filtration to the amount of the washing liquid permeated through the separation membrane in washing to not more than 600.

In the aforementioned spiral wound membrane module, the raw liquid can be fed from an end of the spiral wound membrane element to be subjected to filtration. In this case, the membrane surface of the spiral wound membrane element captures contaminants.

In washing, the washing liquid introduced from at least one opening end of the perforated hollow pipe is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface are separated from the membrane surface.

In this case, the separation membrane is subjected to back wash reverse filtration with the back pressure higher than 0.05 MPa and not more than 0.3 MPa, whereby a necessary amount of the washing liquid can be fed in a short time. Thus, contaminants deposited on the membrane surface of the separation membrane can be effectively removed. Consequently, stable filtration running can be performed while maintaining a high permeate flux over a long period also in dead end filtration readily causing deposition of contaminants on the membrane surface.

The separation membrane can be prevented from application of an excessive load and contaminants adhering to the outer periphery can be removed by sufficient washing so that stable running can be performed continuously over a long period with high filtration efficiency by setting the ratio of the amount of the permeated liquid permeated through the separation membrane in filtration to the amount of the washing liquid permeated through the separation membrane in washing to not more than 600.

According to the aforementioned method of running a spiral wound membrane module, as hereinabove described, dead end filtration can be so stably performed that the permeated liquid can be efficiently obtained. Further, no large pump is required for feeding the raw liquid but the scale of the system can be reduced. Thus, the system cost is reduced.

When the raw liquid is fed so that the flow rate of the permeated liquid in filtration is at least 0.5 m$^3$/m$^2$/day and not more than 4.0 m$^3$/m$^2$/day and the filtration time is set to at least 10 minutes and not more than 300 minutes, the washing liquid is preferably introduced into the perforated hollow pipe so that the flow rate of the washing liquid in washing is at least 1.0 m$^3$/m$^2$/day and not more than 4.0 m$^3$/m$^2$/day and the washing time is preferably set to at least 10 seconds and not more than 300 seconds.

Particularly when the raw liquid is fed so that the flow rate of the permeated liquid in filtration is at least 0.5 m$^3$/m$^2$/day and not more than 2.0 m$^3$/m$^2$/day and the filtration time is set to at least 10 minutes and not more than 60 minutes, the washing liquid is more preferably introduced into the perforated hollow pipe so that the flow rate of the washing liquid in washing is at least 1.0 m$^3$/m$^2$/day and not more than 3.0 m$^3$/m$^2$/day, the washing time is more preferably set to at least 30 seconds and not more than 60 seconds, and the ratio of the amount of the permeated liquid permeated through the separation membrane in filtration to the amount of the washing liquid permeated through the separation membrane in washing is more preferably set to not more than 240.

Particularly when the raw liquid is fed so that the flow rate of the permeated liquid in filtration is at least 0.5 m$^3$/m$^2$/day and not more than 2.0 m$^3$/m$^2$/day and the filtration time is set to at least 10 minutes and not more than 30 minutes, the washing liquid is more preferably introduced into the perforated hollow pipe so that the flow rate of the washing liquid in washing is at least 1.0 m$^3$/m$^2$/day and not more than 3.0 m$^3$/m$^2$/day, the washing time is more preferably set to at least 30 seconds and not more than 60 seconds, and the ratio of the amount of the permeated liquid permeated through the separation membrane in filtration to the amount of the washing liquid permeated through the separation membrane in washing is more preferably set to not more than 120.

Thus, contaminants adhering to the membrane surface can be sufficiently separated, stable running can be performed continuously over a long period, and reduction of filtration efficiency can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a partially fragmented perspective view of a spiral wound membrane element employed for the spiral wound membrane module shown in FIG. 1;

DESCRIPTION OF THE PREFERRED EMBODIMENTS

Figure 1:
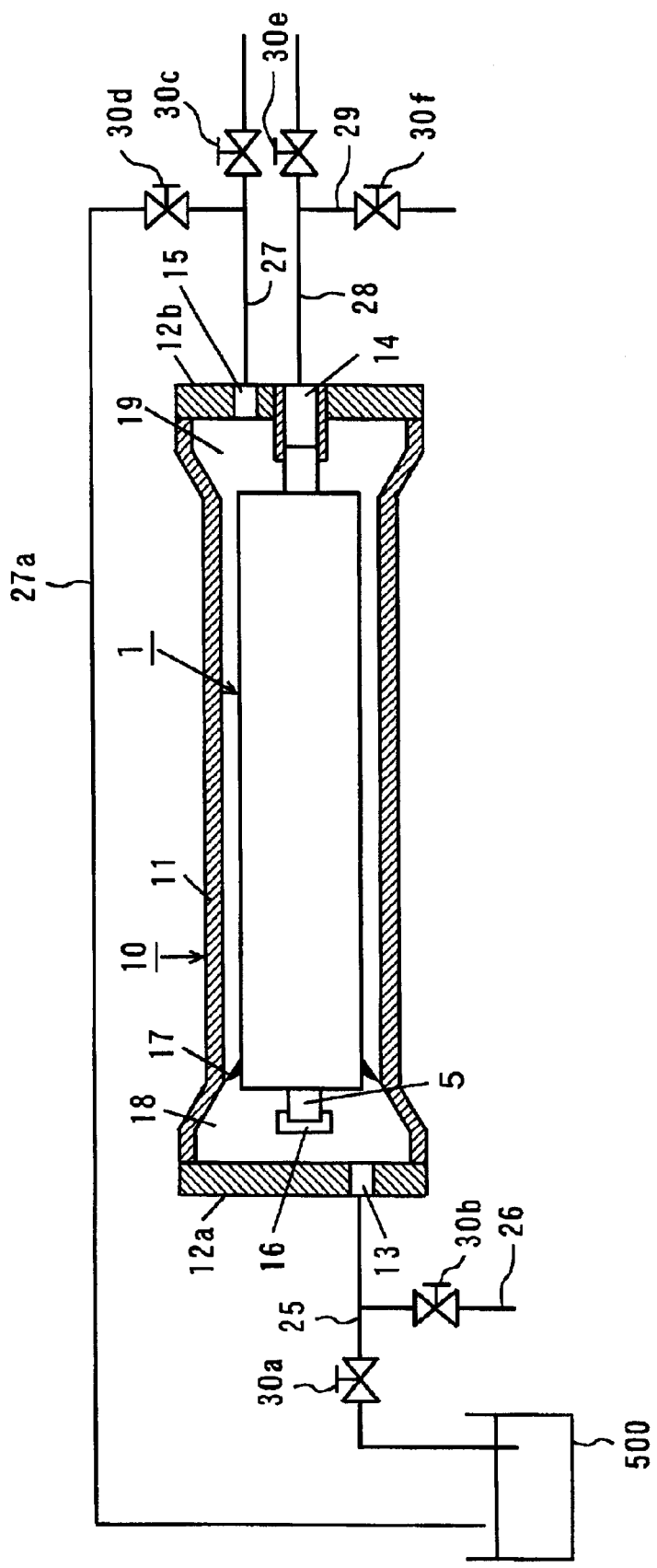
FIG. 1 is a schematic sectional view showing an exemplary spiral wound membrane module according to an embodiment of the present invention.

FIG. 1 is a schematic sectional view showing an exemplary spiral wound membrane module according to an embodiment of the present invention.

As shown in FIG. 1, the spiral wound membrane module is formed by storing a spiral wound membrane element 1 in a pressure vessel (pressure-resistant vessel) 10. The pressure vessel 10 is formed by a tubular case 11 and a pair of end plates 12a and 12b. The first end plate 12a is formed with a raw water inlet 13, and the second end plate 12b is formed with a raw water outlet 15. A permeate outlet 14 is provided on the central portion of the second end plate 12b. The structure of the pressure vessel 10 is not restricted to that shown in FIG. 1, but a pressure vessel of a side entry shape having a tubular case provided with a raw water inlet and a raw water outlet may alternatively be employed, as described later.

The spiral wound membrane element 1 having a packing 17 mounted in the vicinity of an end of its outer peripheral surface is charged in the tubular case 11, and both opening ends of the tubular case 11 are sealed with the end plates 12a and 12b respectively. A first opening end of a water collection pipe 5 is engaged with the permeate outlet 14 of the end plate 12b, and an end cap 16 is mounted on a second opening end thereof. The packing 17 divides the internal space of the pressure vessel 10 into a first liquid chamber 18 and a second liquid chamber 19.

The raw water inlet 13 of the spiral wound membrane module is connected to a raw water tank 500 through a pipe 25. A valve 30a is interposed in the pipe 25, and a pipe 26 having a valve 30b interposed therein is connected downstream the valve 30a. A pipe 27 having a valve 30c interposed therein is connected to the raw water outlet 15, and a pipe 27a having a valve 30d interposed therein is connected upstream the valve 30c of the pipe 27. The raw water outlet 15 is connected to the raw water tank 500 through the pipe 27a. A pipe 28 having a valve 30e interposed therein is connected to the permeate outlet 14, and a pipe 29 having a valve 30f interposed therein is connected upstream the valve 30e.

FIG. 5 is a partially fragmented perspective view of the spiral wound membrane element 1 employed for the spiral wound membrane module shown in FIG. 1.

As shown in FIG. 5, the spiral wound membrane element 1 is formed by superposing separation membranes 2 on both surfaces of a permeate spacer 3 made of a net of synthetic resin and bonding the former to the latter on three sides thereby forming an envelope-like membrane (baggy membrane) 4, mounting an opening of the envelope-like membrane 4 on the water collection pipe 5 and spirally winding the envelope-like membrane 4 on the outer peripheral surface of the water collection pipe 5 along with a raw water spacer 6 formed by a net of synthetic resin. The outer peripheral surface of the spiral wound membrane element 1 is covered with a sheath member.

This spiral wound membrane element 1 can be subjected to back wash reverse filtration with a back pressure of 0.05 to 0.3 MPa by employing the separation membranes 2 having a structure described later.

Figure 2:
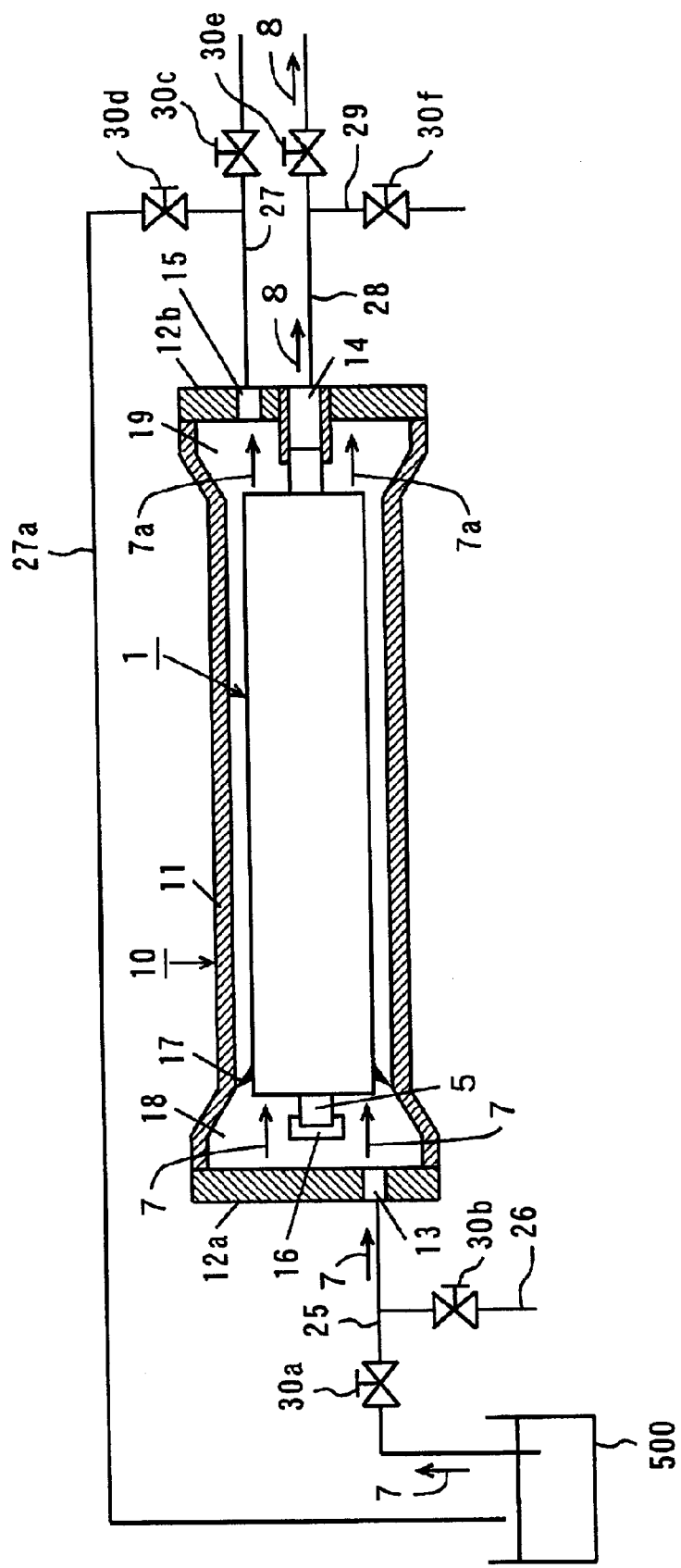
FIGS. 2 and 3 are schematic sectional views showing an exemplary method of running a spiral wound membrane module according to the present invention.
Figure 3:
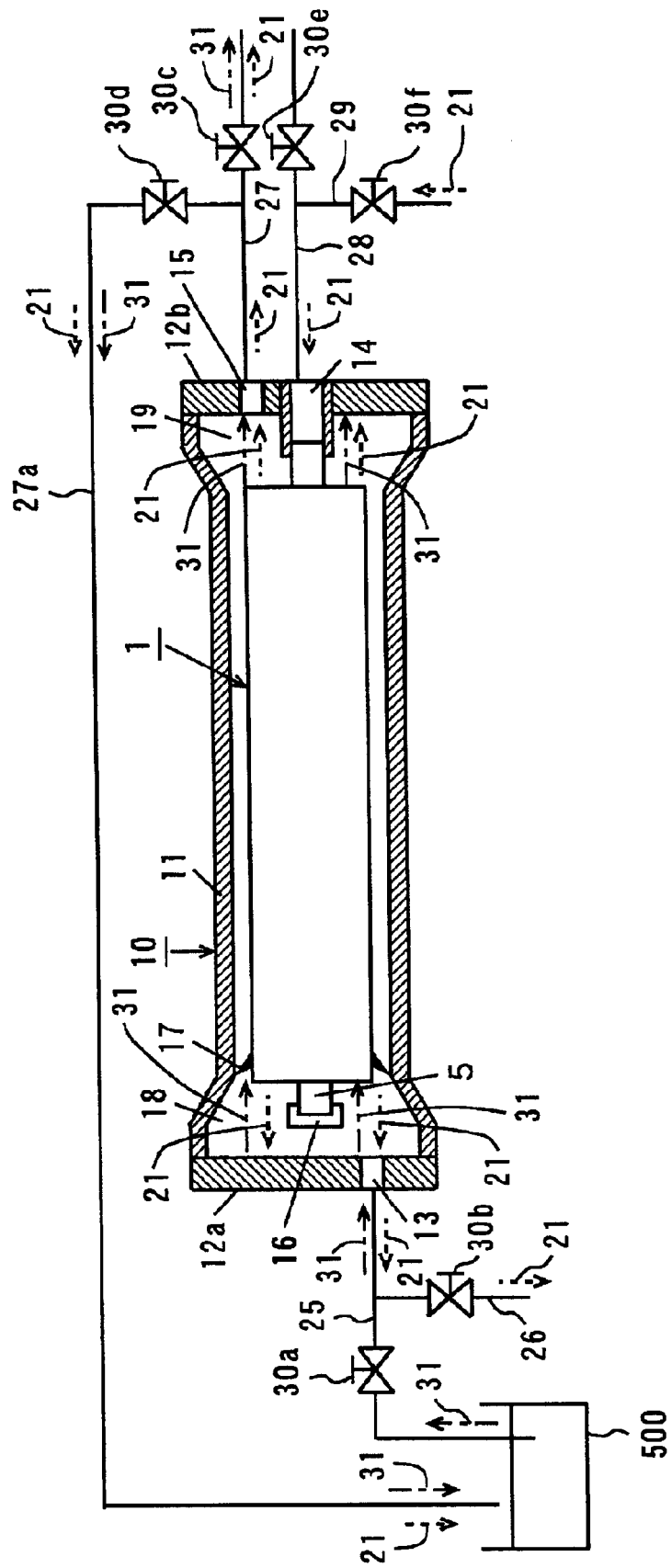

FIGS. 2 and 3 are schematic sectional views showing an exemplary method of running a spiral wound membrane module according to the present invention. This running method is applied to the spiral wound membrane module shown in FIG. 1, and FIG. 2 shows a running method in filtration, while FIG. 3 shows a running method in washing.

As shown in FIG. 2, the valves 30a and 30e of the pipes 25 and 28 are opened and the valves 30b, 30c, 30d and 30f of the pipes 26, 27, 27a and 29 are closed in filtration.

Raw water 7 taken from the raw water tank 500 is fed into the pressure vessel 10 from the raw water inlet 13 through the pipe 25. In the spiral wound membrane module, the fed raw water 7 is introduced into the first liquid chamber 18 of the pressure vessel 10 from the raw water inlet 13, and further fed into the spiral wound membrane element 1 from an end thereof.

As shown in FIG. 5, the raw water 7 fed into the spiral wound membrane element 1 from the first end surface thereof linearly flows toward the second end surface along the raw water spacer 6 in a direction (axial direction) parallel to the water collection pipe 5. In the process of the flow of the raw water 7 along the raw water spacer 6, part of the raw water 7 is permeated through the separation membranes 2 due to the pressure difference between the raw water side and a permeate side. This permeate 8 flows into the water collection pipe 5 along the permeate spacer 8, and is discharged from the end of the water collection pipe 5. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 2. The raw water 7a discharged from the second end surface of the spiral wound membrane element 1 is guided into the second liquid chamber 19. In this case, the valve 30c of the pipe 27 connected to the raw water outlet 15 and the valve 30d of the pipe 27a are closed, whereby permeation through the separation membranes 2 is facilitated in the spiral wound membrane element 1 for performing dead end filtration.

When the permeate flow rate exceeds 4.0 m$^3$/m$^2$/day or the filtration time exceeds 300 minutes, a load applied to the separation membranes 2 forming the envelope-like membrane 4 of the spiral wound membrane element 1 is increased while contaminants contained in the raw water 7 captured by the separation membranes 2 are increased and deposited on the separation membranes 2. Thus, it is difficult to stably run the spiral wound membrane module continuously over a long period.

When the permeate flow rate is less than 0.5 m$^3$/m$^2$/day or the filtration time is less than 10 minutes, a load applied to the separation membranes 2 of the spiral wound membrane element 1 is reduced. In this case, however, filtration efficiency is so low that the flow rate of the obtained permeate is reduced, and hence large-scale equipment is required for obtaining the target permeate flow rate.

Therefore, the raw water 7 is preferably fed to the spiral wound membrane element 1 so that the permeate flow rate is 0.5 to 4.0 m$^3$/m$^2$/day, and the filtration time is preferably set to 10 to 300 minutes. Thus, the separation membranes 2 can be prevented from application of an excessive load as well as deposition of contaminants, whereby stable running can be performed continuously over a long period. Further, the target permeate flow rate can be efficiently obtained.

In particular, the raw water 7 is more preferably fed to the spiral wound membrane element 1 so that the permeate flow rate is 0.5 to 2.0 m$^3$/m$^2$/day. Thus, the load applied to the separation membranes 2 is further reduced so that more stable running can be performed.

In the aforementioned filtration process, suspended, colloidal or dissolved matter contained in the raw water 7 is deposited on the membrane surfaces of the separation membranes 2 of the spiral wound membrane element 1 as contaminants. In particular, contaminants are readily deposited on the membrane surfaces of the separation membranes 2 in dead end filtration. Such deposition of contaminants results in reduction of the water permeation velocity, and hence the contaminants are removed by the following washing.

As shown in FIG. 3, the valves 30a, 30e and 30d of the pipes 25, 28 and 27a are closed and the valves 30b, 30f and 30c of the pipes 26, 29 and 27 are opened in washing, for performing back wash reverse filtration.

In this back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with the sheath member, whereby the wash water 21 permeated through the separation membranes 2 axially flows through the spiral wound membrane element 1 along the raw water spacer 6, and is discharged into the first and second liquid chambers 18 and 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are set to apply a back pressure of 0.05 to 0.3 MPa to the separation membranes 2. Thus, a necessary amount of the wash water 21 can be fed in a short time, so that contaminants depositing on the membrane surfaces of the separation membranes 2 can be effectively separated. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this example, the wash water 21 may alternatively be partially discharged from the system and partially recycled as the raw water 7. For example, a further pipe may be provided downstream the valve 30b of the pipe 27 and connected to the raw water tank 500, for partially returning the wash water 21 to the raw water tank 500.

While the wash water 21 taken out from the raw water outlet 15 is totally discharged from the system as waste water in this example, the wash water 21 may alternatively be partially discharged from the system and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 and taken out from the raw water inlet 13 and the raw water outlet 15 through the pipes 26 and 27 respectively in back wash reverse filtration in the example shown in FIG. 3, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 and the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 and the raw water inlet 13 are closed.

After performing back wash reverse filtration in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed into the spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 along with the raw water 31, and discharged from the second end of the spiral wound membrane element 1 into the second liquid chamber 19 along with the wash water 21 remaining in the spiral wound membrane element 1. Further, the contaminants are taken out from the pressure vessel 10 from the raw water outlet 15 through the pipe 27 along with the raw water 31.

Therefore, the contaminants separated from separation membranes 2 in the spiral wound membrane element 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

According to the aforementioned running method in washing, contaminants deposited on the separation membranes 2 in filtration can be effectively removed, whereby stable running can be performed without reducing the permeate flux over a long period also in dead end filtration readily causing deposition of contaminants on the membrane surfaces.

As hereinabove described, the aforementioned filtration running and back wash reverse filtration are alternately repeated in the method of running the spiral wound membrane element 1.

If the time of back wash reverse filtration is less than 10 seconds or the permeate flow rate in back wash reverse filtration is less than 1 m$^3$/m$^2$/day, it is difficult to sufficiently separate contaminants adhering to the membrane surface of the spiral wound membrane element 1 but contaminants are deposited on the membrane surface. Therefore, it is difficult to perform stable running continuously over a long period.

If the time of back wash reverse filtration exceeds 300 seconds or the permeate flow rate in back wash reverse filtration exceeds 4 m$^3$/m$^2$/day, a large amount of permeate obtained by filtration is employed as the wash water 21 and hence the flow rate of the obtained permeate is reduced as a whole to reduce filtration efficiency, although contaminants adhering to the membrane surface of the spiral wound membrane element 1 can be sufficiently separated.

Therefore, the time of back wash reverse filtration is preferably set to 10 to 300 seconds, and the permeate flow rate in back wash reverse filtration is preferably set to 1 to 4 m$^3$/m$^2$/day. Thus, contaminants adhering to the membrane surface of the spiral wound membrane element 1 can be sufficiently separated for performing stable running continuously over a long period, and reduction of the filtration efficiency can be suppressed.

The permeate flow rate in filtration, the filtration time, the permeate flow rate in back wash reverse filtration and the back wash reverse filtration time are so set that the ratio $V_1/V_2$ of the permeate volume (the amount of the permeate permeated through the envelope-like membrane 4 in the running period) $V_1$ in filtration to the permeate volume (the amount of the permeate permeated through the envelope-like membrane 4 in the washing period) $V_2$ in back wash reverse filtration is not more than 600. Thus, the separation membranes 2 can be prevented from application of an excessive load, and contaminants adhering to the membrane surfaces can be removed by sufficient washing so that stable running can be performed continuously over a long period with high filtration efficiency.

In particular, the raw water is more preferably fed so that the permeate flow rate in filtration is 0.5 to 2.0 m$^3$/m$^2$/day, and the filtration time is more preferably set to 10 to 60 minutes. Further, the permeate is preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 240. When the ratio $V_1/V_2$ of the permeate volume $V_1$ in filtration to the permeate volume $V_2$ in back wash reverse filtration is not more than 240, stable running can be more preferably performed continuously over a long period with higher filtration efficiency.

In particular, the raw water is more preferably fed so that the permeate flow rate in filtration is 0.5 to 2.0 m$^3$/m$^2$/day, and the filtration time is more preferably set to 10 to 30 minutes. Further, the permeate is preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 120. When the ratio $V_1/V_2$ of the permeate volume $V_1$ in filtration to the permeate volume $V_2$ in back wash reverse filtration is not more than 120, stable running can be more preferably performed continuously over a long period with higher filtration efficiency.

For example, the pressure for feeding the raw water 7 is so adjusted that a permeate flow rate of 2.0 m$^3$/m$^2$/day is obtained in filtration for performing filtration for 30 minutes, and the pressure for feeding the permeate 8 is so adjusted that the permeate flow rate is 1 m$^3$/m$^2$/day in back wash reverse filtration for performing back wash reverse filtration for 30 minutes in the aforementioned running method. In this case, the ratio $V_1/V_2$ of the permeate volume $V_1$ in filtration to the permeate volume $V_2$ in back wash reverse filtration is 120. In this case, recovery of the permeate is 99.2%, with high filtration efficiency. Further, the load applied to the separation membranes 2 can be reduced and contaminants adhering to the membrane surfaces can be sufficiently removed, whereby stable running can be performed continuously over a long period.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Alternatively, flushing of axially feeding the raw water 31 may be performed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 13 and taken out from the raw water outlet 15 in this example, the raw water 31 may alternatively be fed from the raw water outlet 15 and taken out from the raw water inlet 13, to be fed through the spiral wound membrane element 1 in the direction opposite to that in filtration. In this case, an effect similar to that attained when feeding the raw water 31 in the same direction as that in filtration as described above can be attained.

When the raw water 31 is fed in the same direction as that in filtration, contaminants deposited on a side closer to the second liquid chamber 19 of the spiral wound membrane element 1 can be readily removed and discharged in particular. When the raw water 31 is fed in the direction opposite to that in filtration, contaminants deposited on a side closer to the first liquid chamber 18 of the spiral wound membrane element 1 can be readily removed and discharged in particular.

Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this example, the raw water 31 may alternatively be partially discharged from the system and partially recycled as raw water. For example, the valves 30c and 30d of the pipes 27 and 27a may be opened for partially returning the raw water 31 to the raw water tank 500 through the pipe 27a.

According to this exemplary running method shown in FIGS. 2 and 3, contaminants deposited on the membrane surface of the spiral wound membrane element 1 can be sufficiently removed, whereby dead end filtration can be stably performed while maintaining a high permeate flux in the spiral wound membrane module shown in FIG. 1, for efficiently obtaining the permeate 8. In this case, dead end filtration is performed, whereby no large pump may be required for feeding the raw water 7 but the scale of the system can be reduced. Thus, the system cost is reduced.

Figure 4:
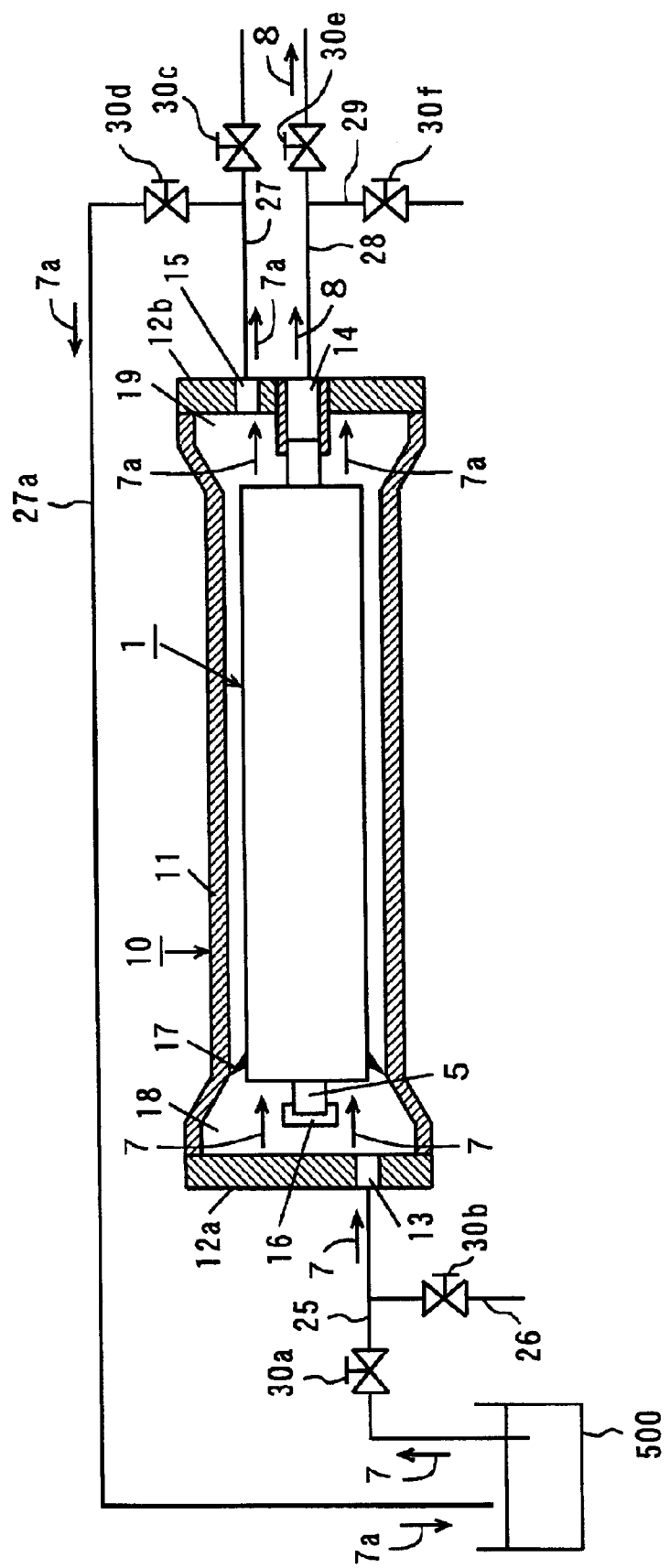
FIG. 4 is a schematic sectional view showing another exemplary method of running a spiral wound membrane module according to the present invention.

FIG. 4 is a schematic sectional view showing another exemplary method of running a spiral wound membrane module according to the present invention. The running method shown in FIG. 4, employed in filtration, is applied to the spiral wound membrane module shown in FIG. 1 also in this case. In this example, a running method in washing is similar to the aforementioned running method shown in FIG. 3.

As shown in FIG. 4, the valves 30a, 30e and 30d of the pipes 25, 28 and 27a are opened and the valves 30b, 30c and 30f of the pipes 26, 27 and 29 are closed in filtration.

In this case, the raw water 7 taken from the raw water tank 500 is introduced into the first liquid chamber 18 of the pressure vessel 10 from the raw water inlet 13 through the pipe 25, similarly to the case shown in FIG. 2. Further, the raw water 7 is fed into the spiral wound membrane element 1 from the first end thereof.

As shown in FIG. 5, partial raw water is permeated through the separation membranes 2, flows into the water collection pipe 5 and is discharged from the end of the water collection pipe 5 as the permeate 8 in the spiral wound membrane element 1. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 4. The raw water 7a discharged from the second end surface of the spiral wound membrane element 1 is guided into the second liquid chamber 19 and thereafter taken out from the raw water outlet 15 through the pipe 27a, to be returned to the raw water tank 500. Thus, filtration is performed in the spiral wound membrane module while taking out the partial raw water 7a from the raw water outlet 15 in this example. Thus, retention of any liquid can be suppressed in the clearance between the outer peripheral surface of the spiral wound membrane element 1 and the inner peripheral surface of the pressure vessel 10. Further, an axial flow of the raw water from the first end toward the second end is formed in the spiral wound membrane element 1, whereby partial contaminants can be discharged from the pressure vessel 10 along with the raw water 7a while suppressing sedimentation of contaminants contained in the raw water.

While the valve 30d is regularly opened for taking out the raw water 7a in the above description, the valve 30d may alternatively be intermittently opened for taking out the raw water 7a. Also in this case, the separation membranes 2 can be inhibited from adhesion of contaminants similarly to the case of regularly taking out the raw water 7a.

While the raw water 7a taken out from the pressure vessel 10 is totally returned to the raw water tank 500 in the above description, the taken out raw water 7a may alternatively be partially discharged from the system. For example, the valves 30d and 30c may be opened for partially discharging the raw water 7a from the system through the pipe 27.

Particularly in this example, partial contaminants can be discharged from the pressure vessel 10 along with the raw water 7a while inhibiting contaminants contained in the raw water from sedimenting on the membrane surface by taking out the partial raw water 7a from the pressure vessel 10 in filtration as shown in FIG. 4, whereby more stable filtration running can be performed. In this case, the raw water 7a taken out from the raw water outlet 15 is circulated through the pipe 27a, whereby the permeate 8 can be obtained in high recovery. Further, no large pump may be employed for feeding the raw water 7 but the scale of the system can be reduced. Thus, the system cost is reduced.

When the permeate flow rate exceeds 4.0 m$^3$/m$^2$/day or the filtration time exceeds 300 minutes, the load applied to the separation membranes 2 forming the envelope-like membrane 4 of the spiral wound membrane element 1 is increased while contaminants contained in the raw water 7 captured by the separation membranes 2 are increased and deposited on the separation membranes 2. Thus, it is difficult to perform stable running continuously over a long period.

When the permeate flow rate is less than 0.5 m$^3$/m$^2$/day or the filtration time is less than 10 minutes, the load applied to the separation membranes 2 of the spiral wound membrane element 1 is reduced. However, filtration efficiency is so low that the flow rate of the obtained permeate is reduced, and hence large-scale equipment is required for obtaining the target permeate flow rate.

Therefore, the raw water 7 is preferably fed to the spiral wound membrane element 1 so that the permeate flow rate is 0.5 to 4.0 m$^3$/m$^2$/day, and the filtration time is preferably set to 10 to 300 minutes. Thus, the separation membranes 2 can be prevented from application of an excessive load and inhibited from deposition of contaminants, and stable running can be performed continuously over a long period. Further, the target permeate flow rate can be efficiently obtained.

In particular, the raw water 7 is more preferably fed to the spiral wound membrane element 1 so that the permeate flow rate is 0.5 to 2.0 m$^3$/m$^2$/day. Thus, the load applied to the separation membranes 2 is further reduced so that more stable running can be performed.

Also in this example, back wash reverse filtration is performed with a high back pressure in washing by the running method in running shown in FIG. 3 while introducing the raw water 31. Thus, contaminants deposited on the separation membranes 2 in filtration can be effectively removed.

As hereinabove described, the aforementioned filtration running and back wash reverse filtration are alternately repeated in the method of running the spiral wound membrane element 1.

If the back wash reverse filtration time is less than 10 seconds or the permeate flow rate in back wash reverse filtration is less than 1 m$^3$/m$^2$/day, it is difficult to sufficiently separate contaminants adhering to the membrane surface of the spiral wound membrane element 1, and contaminants are deposited on the membrane surface. Thus, it is difficult to perform stable running continuously over a long period.

If the back wash reverse filtration time exceeds 300 seconds or the permeate flow rate in back wash reverse filtration exceeds 4 m$^3$/m$^2$/day, a large amount of the permeate obtained by filtration is employed as the wash water 21 and hence the flow rate of the obtained permeate is reduced as a whole to reduce filtration efficiency although contaminants adhering to the membrane surface of the spiral wound membrane element 1 can be sufficiently separated.

Therefore, the back wash reverse filtration time is preferably set to 10 to 300 seconds, and the permeate flow rate in back wash reverse filtration is preferably set to 1 to 4 m$^3$/m$^2$/day. Thus, contaminants adhering to the membrane surface of the spiral wound membrane element 1 can be sufficiently separated so that stable running can be performed continuously over a long period, and reduction of filtration efficiency can be suppressed.

In the aforementioned running method, the permeate flow rate in filtration, the filtration time, the permeate flow rate in back wash reverse filtration and the back wash reverse filtration time are so set that the ratio $V_1/V_2$ of the permeate volume $V_1$ in filtration to the permeate volume $V_2$ in back wash reverse filtration is not more than 600. Thus, the separation membranes 2 can be prevented from application of an excessive load and contaminants adhering to the membrane surface can be removed by sufficient washing, for performing stable running continuously over a long period with high filtration efficiency.

In particular, the raw water is more preferably fed so that the permeate flow rate in filtration is 0.5 to 2.0 m$^3$/m$^2$/day, and the filtration time is more preferably set to 10 to 60 minutes. Further, the permeate is more preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 240. Thus, the ratio $V_1/V_2$ of the permeate volume $V_1$ in filtration to the permeate volume $V_2$ in back wash reverse filtration is preferably not more than 240, so that stable running can be performed continuously over a long period with higher filtration efficiency.

In particular, the raw water is more preferably fed so that the permeate flow rate in filtration is 0.5 to 2.0 m$^3$/m$^2$/day, and the filtration time is more preferably set to 10 to 30 minutes. Further, the permeate is more preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 120. Thus, the ratio $V_1/V_2$ of the permeate volume $V_1$ in filtration to the permeate volume $V_2$ in back wash reverse filtration is preferably not more than 120, so that stable running can be performed continuously over a long period with higher filtration efficiency.

For example, the pressure for feeding the raw water 7 is so adjusted as to obtain a permeate flow rate of 2.0 m$^3$/m$^2$/day in filtration for performing filtration for 30 minutes, and thereafter the pressure for feeding the permeate 8 is so adjusted as to obtain a permeate flow rate of 1 m$^3$/m$^2$/day in back wash reverse filtration for performing back wash reverse filtration for 30 seconds. In this case, the ratio $V_1/V_2$ of the permeate volume $V_1$ in filtration to the permeate volume $V_2$ in back wash reverse filtration is 120. In this case, recovery of the permeate 8 is 99.2% with high filtration efficiency. Further, the load applied to the separation membranes 2 can be reduced and contaminants adhering to the membrane surface can be sufficiently removed, whereby stable running can be performed continuously over a long period.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Further alternatively, flushing of axially feeding the raw water 31 may be performed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

According to the running method of this example, as hereinabove described, contaminants deposited on the membrane surface can be sufficiently removed, whereby stable running can be performed without reducing the permeate flux over a long period.

While the spiral wound membrane module comprising the single spiral wound membrane element 1 is run in the above description, the running method according to the present invention is also applicable to a spiral wound membrane module comprising a plurality of spirally wound membrane elements.

Figure 6:
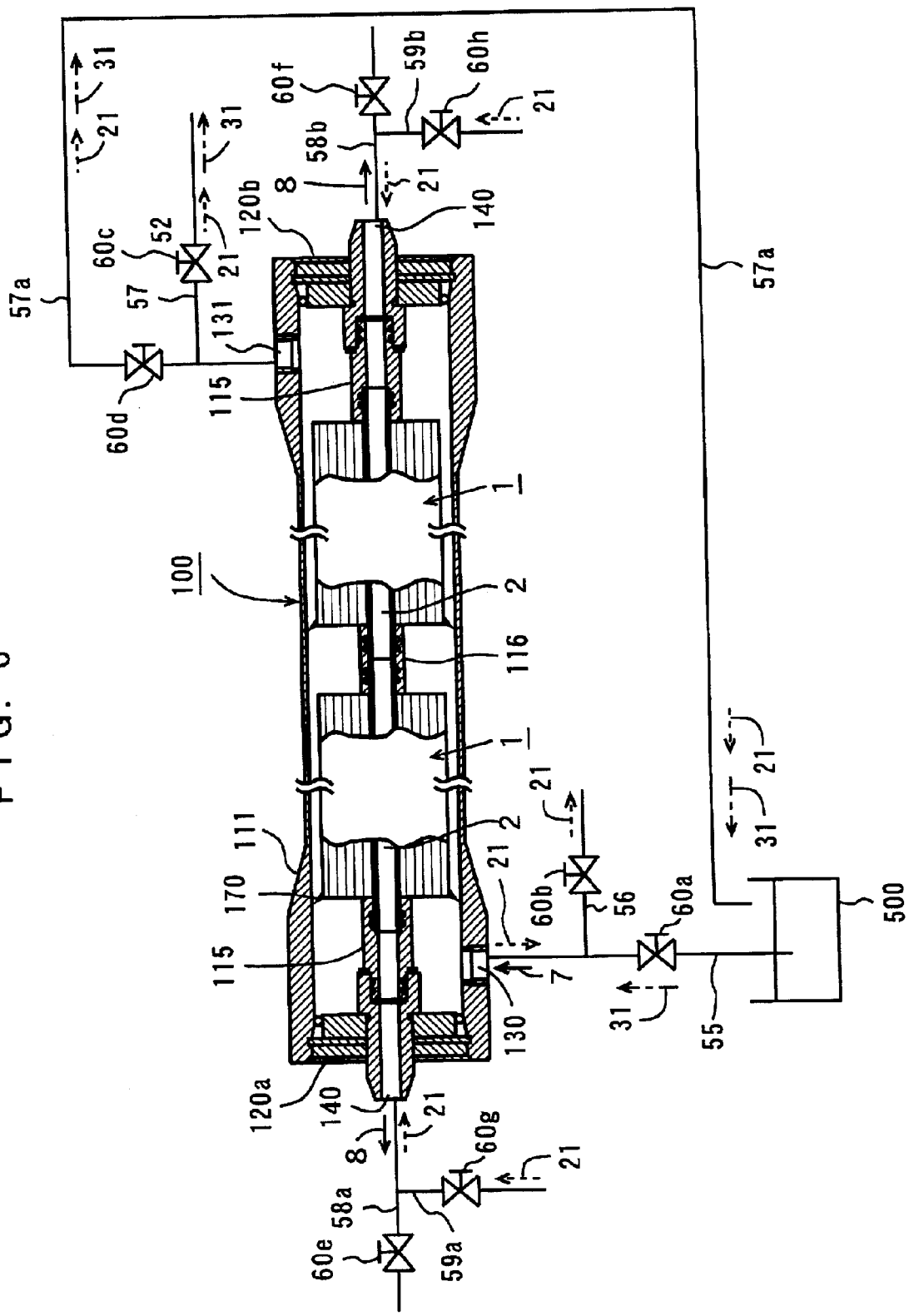
FIG. 6 is a schematic sectional view showing still another exemplary method of running a spiral wound membrane module according to the present invention.

FIG. 6 is a schematic sectional view showing still another exemplary method of running a spirally wound membrane module according to the present invention.

As shown in FIG. 6, this spiral wound membrane module is formed by storing a plurality of spirally wound membrane elements 1 in a pressure vessel 100. The pressure vessel 100 is formed by a tubular case 111 and a pair of end plates 120a and 120b. A raw water outlet 130 is formed on the bottom portion of the tubular case 111, and a raw water outlet 131 is formed on the upper portion thereof. Thus, the pressure vessel 100 has a side entry shape. The raw water outlet 131 is employed also for deairing. Permeate outlets 140 are provided on the central portions of the end plates 120a and 120b.

The plurality of spiral wound membrane elements 1 having water collection pipes 5 serially connected with each other by interconnectors 116 are stored in the tubular case 111, and both opening ends of the tubular case 111 are sealed with the end plates 120a and 120b respectively. Each of the spiral wound membrane elements 1 is formed by the spiral wound membrane element 1 shown in FIG. 5. Single ends of the water collection pipes 5 of the endmost spiral wound membrane elements 1 are engaged with the permeate outlets 140 of the end plates 120a and 120b respectively through adaptors 115. Packings 170 are mounted on portions closer to single ends of the outer peripheral surfaces of the spiral wound membrane elements 1, to separate the internal space of the pressure vessel 100 into a plurality of liquid chambers.

The raw water inlet 130 of the spiral wound membrane module is connected to a raw water tank 500 through a pipe 55. A valve 60a is interposed in the pipe 55, and a pipe 56 having a valve 60b interposed therein is connected downstream the valve 30a. A pipe 57 having a valve 60c interposed therein is connected to the raw water outlet 131, and a pipe 57a having a valve 60d interposed therein is connected upstream the valve 60c of the pipe 57. The raw water outlet 131 is connected to the raw water tank 500 through the pipe 57a. A pipe 58a having a valve 60e interposed therein is connected to the permeate outlet 140 of the end plate 120a, and a pipe 59a having a valve 60g interposed therein is connected upstream the valve 60e. A pipe 58b having a valve 60f interposed therein is connected to the permeate outlet 140 of the end plate 120b, and a pipe 59b having a valve 60h interposed therein is connected upstream the valve 60f.

In filtration of the spiral wound membrane module, the valves 60a, 60e and 60f of the pipes 55, 58a and 58b are opened, and the valves 60b, 60g, 60h, 60c and 60d of the pipes 56, 59a, 59b, 57 and 57a are closed.

Raw water 7 taken from the raw water tank 500 is fed into the pressure vessel 100 from the raw water inlet 130 through the pipe 55. In the spiral wound membrane module, the raw water 7 fed from the raw water inlet 130 is introduced into the endmost spiral wound membrane element 1 closer to the end plate 120a from a first end surface thereof. In this spiral wound membrane element 1, partial raw water is permeated through the separation membranes 2 to flow into the water collection pipe 5, and discharged from an end of the water collection pipe 5, as shown in FIG. 5. The remaining raw water 7a not permeated through the separation membranes 2 is discharged from a second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of spiral wound membrane elements 1 serially connected with each other. In this case, the valves 60c and 60d of the pipes 57 and 57a are closed and hence permeation through the separation membranes 2 is facilitated in each spiral wound membrane element 1, for performing dead end filtration in the spiral wound membrane module.

In the aforementioned filtration process, contaminants contained in the raw water 7 are deposited on the membrane surfaces of the separation membranes 2 of the spiral wound membrane elements 1. Particularly when dead end filtration is performed in the spiral wound membrane module comprising the plurality of spiral wound membrane elements 1 as described above, contaminants are readily deposited on the membrane surfaces of the separation membranes 2. Such deposition of contaminants results in reduction of the water permeation velocity, and hence the contaminants are removed by the following washing:

In washing, the valves 60a, 60e, 60f and 60d of the pipes 55, 58a, 58b and 57a are closed and the valves 60b, 60c, 60g and 60h of the pipes 56, 57, 59a and 59b are opened for performing back wash reverse filtration.

In back wash reverse filtration, wash water 21 is fed to first ends of the water collection pipes 5 closer to the end plate 120a from the permeate outlet 140 through the pipes 59a and 58a. Further, wash water 21 is fed to second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surface of the water collection pipe 5 in each spiral wound membrane element 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane element 1 along a raw water spacer 6, and is discharged from both ends of each spiral wound membrane element 1. The discharged wash water 21 is taken out from the raw water inlet 130 and the raw water outlet 131 through the pies 56 and 57 respectively.

In this case, pressures on the sides of the permeate outlets 140, the raw water inlet 130 and the raw water outlet 131 are set to apply a back pressure of about 0.05 to 0.3 MPa to the separation membranes 2 of each spiral membrane element 1. Thus, a necessary amount of the wash water 21 can be fed in a short time, for effectively separating contaminants deposited on the membrane surfaces of the separation membranes 2. Further, the separated contaminants can be inhibited from being captured by the raw water spacer 6 before the same are discharged from an end of each spiral wound membrane element 1, to be effectively removed.

While the wash water 21 taken out from the raw water inlet 130 is totally discharged from the system as waste water in this example, the wash water 21 may alternatively be partially discharged from the system as waste water and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 is totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While wash water 21 is taken out from the raw water inlet 130 and the raw water outlet 131 through the pipes 56 and 57 respectively in back wash reverse filtration in the example shown in FIG. 6, the pressures on the sides of the permeate outlets 140 and the raw water inlet 130 may alternatively be so set that the wash water 21 is taken out from the raw water inlet 130 through the pipe 56. In this case, the valve 60c of the pipe 57 and the raw water outlet 131 are closed. Further alternatively, the pressures on the sides of the permeate outlets 140 and the raw water outlet 131 may be so set that the wash water 21 is taken out from the raw water outlet 131 through the pipe 57. In this case, the valve 60b of the pipe 56 and the raw water inlet 130 are closed.

After performing back wash reverse filtration in the aforementioned manner, the valves 60b, 60g and 60h of the pipes 56, 59a and 59b are closed and the valve 60a of the pipe 55 is opened. Thus, raw water 31 taken from the raw water tank 500 is fed into the pressure vessel 100 from the raw water inlet 130 through the pipe 55. The raw water 31 is introduced into each spiral wound membrane element 1 from the first end thereof, axially flows through the spiral wound membrane element 1 along the raw water spacer 6 and is thereafter discharged from the second end. Thus, contaminants separated from the separation membrane 2 are carried from the first end toward the second end of the spiral wound membrane element 1 by the raw water 31, and discharged from the second end of the spiral wound membrane element 1 along with the wash water 21 remaining in the spiral wound membrane element 1. Further, contaminants and the wash water 21 are taken out from the pressure vessel 100 from the raw water outlet 131 through the pipe 57 along with the raw water 31.

Therefore, the contaminants separated from the separation membranes 2 in each spiral wound membrane element 1 can be quickly discharged from the system by feeding the raw water 31 in the same direction as that in filtration after back wash reverse filtration. Thus, the contaminants separated from the separation membranes 2 can be prevented from adhering to the separation membranes 2 again.

Also in this example, the raw water 7 is preferably fed so that the permeate flow rate through each spiral wound membrane element 1 is 0.5 to 4.0 m$^3$/m$^2$/day and the filtration time is preferably set to 10 to 300 minutes, similarly to the method of running a spiral wound membrane element and a spiral wound membrane module shown in FIG. 1. Thus, the separation membranes 2 can be prevented from application of an excessive load and inhibited from deposition of contaminants, so that stable running can be performed continuously over a long period. Further, the target permeate flow rate can be efficiently obtained.

In particular, the raw water 7 is more preferably fed to the spiral wound membrane element 1 so that the permeate flow rate is 0.5 to 2.0 m$^3$/m$^2$/day. Thus, the load applied to the separation membranes 2 is further reduced, and more stable running can be performed.

The back wash reverse filtration time is preferably set to 10 to 300 seconds, and the permeate flow rate through each spiral wound membrane element 1 in back wash reverse filtration is preferably set to 1.0 to 4.0 m$^3$/m$^2$/day. Thus, contaminants adhering to the membrane surface of the spiral wound membrane element 1 can be sufficiently separated so that stable running can be performed continuously over a long period, and reduction of filtration efficiency can be suppressed.

In the aforementioned method of running a spiral wound membrane module, the ratio $V_1/V_2$ of the permeate volume $V_1$ in filtration to the permeate volume $V_2$ in back wash reverse filtration is preferably not more than 600. Thus, the separation membranes 2 can be prevented from application of an excessive load and contaminants adhering to the membrane surfaces can be removed by sufficient washing, so that stable running can be performed continuously over a long period with high filtration efficiency.

In particular, the raw water is more preferably fed so that the permeate flow rate in filtration is 0.5 to 2.0 m$^3$/m$^2$/day, and the filtration time is more preferably set to 10 to 60 minutes. Further, the permeate is more preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 240. Thus, the ratio $V_1/V_2$ of the permeate volume $V_1$ in filtration to the permeate volume $V_2$ in back wash reverse filtration is preferably not more than 240, so that stable running can be performed continuously over a long period with higher filtration efficiency.

In particular, the raw water is more preferably fed so that the permeate flow rate in filtration is 0.5 to 2.0 m$^3$/m$^2$/day, and the filtration time is more preferably set to 10 to 30 minutes. Further, the permeate is more preferably introduced into the water collection pipe 5 so that the permeate flow rate in back wash reverse filtration is 1.0 to 3.0 m$^3$/m$^2$/day, and the back wash reverse filtration time is more preferably set to 30 to 60 seconds. In this case, the ratio $V_1/V_2$ of the permeate volume $V_1$ in filtration to the permeate volume $V_2$ in back wash reverse filtration is not more than 120. Thus, the ratio $V_1/V_2$ of the permeate volume $V_1$ in filtration to the permeate volume $V_2$ in back wash reverse filtration is preferably not more than 120, so that stable running can be performed continuously over a long period with higher filtration efficiency.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by further introducing the wash water 21. Therefore, an effect similar to that of the aforementioned back wash reverse filtration can be attained also in this case.

Further alternatively, flushing of axially feeding the raw water 31 may be performed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130 to be fed in the direction opposite to that in filtration in each spiral wound membrane element 1. In this case, an effect similar to that attained when feeding the raw water 31 in the same direction as that in filtration as described above can be attained. Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 131 is totally discharged from the system as waste water in this example, the raw water 31 may alternatively be partially discharged from the system and partially recycled as the raw water 7. For example, the valves 60c and 60d of the pipes 57 and 57a may be opened for partially returning the raw water 31 to the raw water tank 500 through the pipe 57a.

According to the aforementioned running method in washing, contaminants deposited on the separation membranes 2 in filtration can be effectively removed.

According to this running method, as hereinabove described, contaminants deposited on the membrane surfaces can be sufficiently removed, whereby running can be stably performed while maintaining a high permeate flux also in dead end filtration readily causing deposition of contaminants on the membrane surfaces, for efficiently obtaining the permeate 8. In this case, dead end filtration is performed, whereby no large pump may be employed for feeding the raw water 7 but the scale of the system can be reduced. Thus, the system cost is reduced.

While the spiral wound membrane module shown in FIG. 6 is subjected to dead end filtration similarly to the example shown in FIG. 2 in the above description, the spiral wound membrane module shown in FIG. 6 may alternatively be subjected to filtration while taking out the partial raw water 7a from the pressure vessel 100 similarly to the example shown in FIG. 4.

In filtration of the spiral wound membrane module shown in FIG. 6, for example, the valve 60d of the pipe 57a may be regularly or intermittently opened for taking out the partial raw water 7a not permeated through the separation membranes 2 of the spiral wound membrane element 1 in the raw water 7 fed into the pressure vessel 100 from the pressure vessel 100 from the raw water outlet 131 through the pipe 57a and returning the same to the raw water tank 500. Thus, retention of any liquid can be suppressed in the clearance between the outer periphery of each spiral wound membrane element 1 and the inner peripheral surface of the pressure vessel 100. Further, an axial flow of raw water is formed from the first end toward the second end in each spiral wound membrane element 1, whereby partial contaminants can be discharged from the pressure vessel 100 along with the raw water 7a while suppressing sedimentation of contaminants in the raw water.

According to the running method performing filtration while partially taking out the raw water, more stable running can be performed without reducing the permeate flux over a long period. In this case, the taken out raw water 7a is circulated through the pipe 57a, whereby the permeate 8 can be obtained with high recovery. Further, no large pump may be employed for feeding the raw water 7 but the scale of the system can be reduced. Thus, the system cost is reduced.

Figure 7:
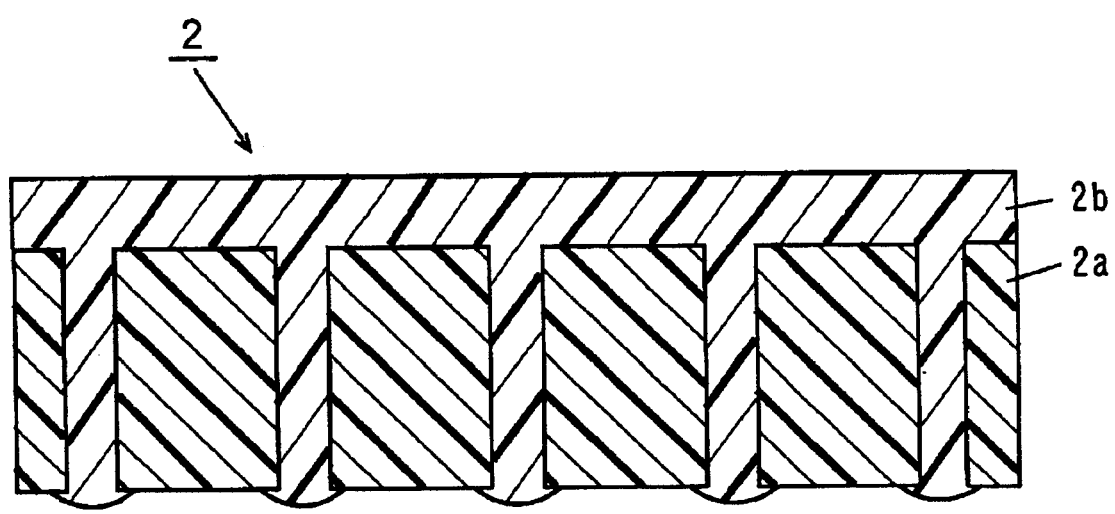
FIG. 7 is a sectional vie of a separation membrane employed for the spiral wound membrane element shown in FIG. 5.

FIG. 7 is a sectional view of each separation membrane 2 employed for the spiral wound membrane element 1 shown in FIG. 5. The separation membrane 2 is formed by closely integrating a permeable membrane body 2b having a substantial separation function with a surface of a porous reinforcing sheet (porous sheet member) 2a.

The permeable membrane body 2b is made of a single type of polysulfone resin or a mixture of at least two types of polysulfone resin, or a copolymer or a mixture of polysulfone resin and a polymer such as polyimide or fluorine-containing polyimide resin. The porous reinforcing sheet 2a is made of woven fabric, nonwoven fabric, a mesh net or a foaming sintered sheet prepared from polyester, polypropylene, polyethylene or polyamide, and the nonwoven fabric is preferable in consideration of the membrane forming property and the cost.

The porous reinforcing sheet 2a and the permeable membrane body 2b are bonded to each other in such an anchored state that the resin component forming the permeable membrane body 2b is partially charged in pores of the porous reinforcing sheet 2a.

Back pressure strength of the separation membrane 2 lined with the porous reinforcing sheet 2a is improved to 0.4 to 0.5 MPa beyond 0.2 MPa. A method of defining the back pressure strength is described later.

In order to attain back pressure strength of at least 0.2 MPa by employing nonwoven fabric as the material for the porous reinforcing sheet 2a, the nonwoven fabric is preferably 0.08 to 0.15 mm in thickness and 0.5 to 0.8 g/cm$^3$ in density. If the thickness is smaller than 0.08 mm or the density is smaller than 0.5 g/cm$^3$, sufficient strength for serving as the reinforcing sheet 2a cannot be attained but it is difficult to ensure back pressure strength of at least 0.2 MPa for the separation membrane 2. If the thickness is larger than 0.15 mm or the density is larger than 0.8 g/cm$^3$, on the other hand, filtration resistance of the porous reinforcing sheet 2a may be increased or the anchoring effect to the nonwoven fabric (porous reinforcing sheet 2a) is reduced to readily cause separation between the permeable membrane body 2b and the nonwoven fabric.

A method of preparing the aforementioned separation membrane 2 is now described. First, a solvent, a non-solvent and a swelling agent are added to polysulfone and the mixture is heated/dissolved for preparing a homogeneous membrane forming solution. The polysulfone resin is not particularly restricted so far as the same has at least one (—SO$_2$—) site in its molecular structure, as shown in the following structural

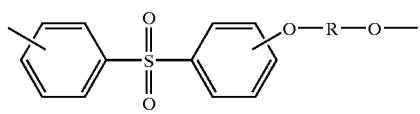 (1)

where R represents a bivalent aromatic, alicyclic or aliphatic hydrocarbon radical or a bivalent organic radical formed by bonding such hydrocarbon radicals with a bivalent organic bonding radical.

Preferably, polysulfone expressed in any of the following structural formulas (2) to (4) is employed:

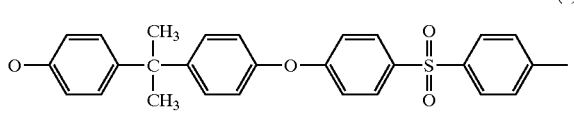 (2)

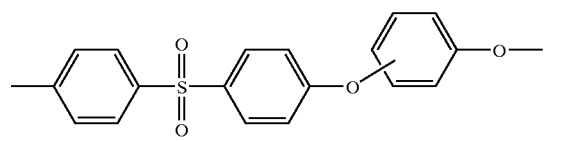 (3)

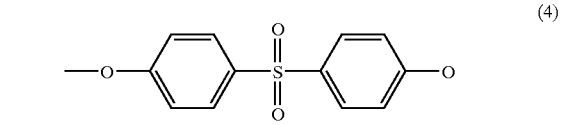 (4)

As the solvent for polysulfone, N-methyl-2-pyrolidone, dimethylformamide, dimethylacetamide, dimethylsulfoxide or the like is preferably employed. As the non-solvent, aliphatic polyhydric alcohol such as ethylene glycol, diethylene glycol, propylene glycol, polyethylene glycol or glycerin, lower aliphatic alcohol such as methanol, ethanol or isopropyl alcohol or lower aliphatic ketone such as methyl ethyl ketone is preferably employed.

The content of the non-solvent in the mixture, not particularly restricted so far as the obtained mixture is homogeneous, is generally 5 to 50 percent by weight, and preferably 20 to 45 percent by weight.

As the swelling agent employed for prompting or controlling formation of a porous structure, metal salt such as lithium chloride, sodium chloride or lithium nitrate, a water-soluble polymer such as polyethylene glycol, polyvinyl alcohol, polyvinyl pyrolidone or polyacrylic acid or metal salt thereof, formamide or the like is employed. The content of the swelling agent in the mixture, not particularly restricted so far as the membrane forming solution is homogeneous, is generally 1 to 50 percent by weight.

The concentration of polysulfone in the membrane forming solution is preferably 10 to 30 percent by weight in general. Permeability of the obtained porous separation membrane is inferior in practicalness if the concentration exceeds 30 percent by weight, while mechanical strength of the obtained porous separation membrane is so inferior that sufficient back pressure strength cannot be attained if the concentration is smaller than 10 percent by weight.

A film of the aforementioned membrane forming solution is formed on a nonwoven fabric support. In other words, a support sheet of nonwoven fabric or the like is successively taken out from a continuous membrane forming apparatus so that the membrane forming solution is applied onto its surface. The membrane forming solution is applied onto the nonwoven fabric support with a gap coater such as a knife coater or a roll coater. When the roll coater is employed, for example, the membrane forming solution is stored between two rolls to be applied onto the nonwoven fabric support and sufficiently impregnated into the nonwoven fabric at the same time, and thereafter passed through a low humidity atmosphere for absorbing a small amount of moisture contained in the atmosphere in the surface of the liquid film applied onto the nonwoven fabric and causing microphase separation on the surface layer of the liquid film. Thereafter the liquid film is dipped in a solidification water tank to be entirely phase-separated and solidified, and the solvent is removed by washing in a washing tank. Thus, the separation membrane 2 is formed.

Thus, the aforementioned separation membrane 2 having high back pressure strength is prevented from breakage also when employed for the spiral wound membrane element 1 shown in FIG. 1 or 6 and subjected to back wash reverse filtration with a back pressure of 0.05 to 0.3 MPa.

EXAMPLES

In each of Inventive Examples 1 to 4 and comparative examples 1 and 2, a spiral wound ultrafiltration membrane element including ultrafiltration membranes having the structure shown in FIG. 7 as the separation membranes 2 was so prepared as to perform a continuous water filtration test on the spiral wound membrane module shown in FIG. 1 comprising this spiral ultrafiltration membrane element.

Each ultrafiltration membrane employed for the spiral wound ultrafiltration membrane elements of Inventive Examples 1 to 4 and comparative examples 1 and 2 was prepared as follows:

16.5 parts by weight of polysulfone (P-3500 by BP Amoco), 50 parts by weight of N-methyl-2-pyrolidone, 24.5 parts by weight of diethylene glycol and 1 part by weight of formamide were heated/dissolved for obtaining a homogeneous membrane forming solution. The membrane forming solution was impregnated into/applied to the surface of polyester nonwoven fabric of 0.1 mm in thickness and 0.8 g/cm$^3$ in density with a roll coater having a coater gap adjusted to 0.13 mm.

Thereafter the nonwoven fabric was passed through an atmosphere (low humidity atmosphere) having relative humidity of 25% and a temperature of 30° C. for causing microphase separation, thereafter dipped in a solidification water tank of 35° C. to be de-solvented and solidified, an thereafter the remaining solvent was removed by washing in a washing tank for obtaining a separation membrane 2. The microphase separation time (the time for passing through the low humidity atmosphere) for the separation membrane 2 was 4.5 seconds in each of Inventive Examples 1 and 2.

The ultrafiltration membrane prepared in the aforementioned manner exhibited a permeate flow rate of 1700 L/m$^2$·hr and back pressure strength of 0.3 MPa, and rejection of polyethylene oxide having a mean molecular weight of 1,000,000 was 99%.

The back pressure strength is defined by a pressure applied when a membrane of 47 mm in diameter is set on a back pressure strength holder (perforated diameter: 23 mm), a water pressure is gradually applied from the side of the porous reinforcing sheet 2a and the permeable membrane body 2b is separated from the porous reinforcing sheet 2a or the permeable membrane body 2b and the porous reinforcing sheet 2a are simultaneously broken.

The rejection of polyethylene oxide was obtained from concentrations of a raw liquid and a permeated liquid through the following formula by permeating a polyethylene oxide solution of 500 ppm in concentration with a pressure of 1 kgf/cm$^2$:

Rejection (%)=[1−(concentration of permeate/concentration of raw liquid)]×100

The continuous water filtration test of the spiral wound membrane module comprising the ultrafiltration membranes prepared in the aforementioned manner is now described.

[Inventive Example 1]

In Inventive Example 1, the spiral wound ultrafiltration membrane element prepared in the aforementioned manner was run with raw water prepared from industrial water (pH: 6 to 8, water temperature: 10 to 30° C.).

A feeding pressure was so adjusted as to obtain a permeate flow rate of 2.0 m$^3$/m$^2$/day in washing, and filtration was performed for 30 minutes by the running method shown in FIG. 2. Thereafter the back wash reverse filtration shown in FIG. 3 was performed. In Inventive Example 1, the time for back wash reverse filtration was set to 30 seconds, and the feeding pressure was so adjusted as to obtain a permeate flow rate of 1.0 m$^3$/m$^2$ day in back wash reverse filtration. Permeate was introduced into the water collection pipe 5 as wash water, and thereafter flushing with the raw water was performed for 20 seconds.

The spiral wound ultrafiltration membrane element was continuously run for 40 days with the aforementioned filtration and back wash reverse filtration, for measuring the transmembrane pressure difference of the spiral wound ultrafiltration membrane element after a lapse of 40 days from starting running.

[Inventive Example 2]

In Inventive Example 2, the spiral wound ultrafiltration membrane element was subjected to filtration and back wash reverse filtration by a running method similar to that of Inventive Example 1 except the following points, for measuring the transmembrane pressure difference of the spiral wound ultrafiltration membrane element after a lapse of 40 days from starting running.

In Inventive Example 2, the time for back wash reverse filtration was set to 30 seconds, and a feeding pressure was so adjusted as to obtain a permeate flow rate of 2.0 m$^3$/m$^2$/day in back wash reverse filtration.

[Inventive Example 3]

In Inventive Example 3, the spiral wound ultrafiltration membrane element was subjected to filtration and back wash reverse filtration by a running method similar to that of Inventive Example 1 except the following points, for measuring the transmembrane pressure difference of the spiral wound ultrafiltration membrane element after a lapse of 40 days from starting running.

In Inventive Example 3, filtration was performed for 20 minutes while adjusting a feeding pressure so as to obtain a permeate flow rate of 1.0 m$^3$/m$^2$/day in filtration. Further, the time for back wash reverse filtration was set to 30 seconds, and a feeding pressure was so adjusted as to obtain a permeate flow rate of 2.0 m$^3$/m$^2$/day in back wash reverse filtration.

[Inventive Example 4]

In Inventive Example 4, the spiral wound ultrafiltration membrane element was subjected to filtration and back wash reverse filtration by a running method similar to that of Inventive Example 1 except the following points, for measuring the transmembrane pressure difference of the spiral wound ultrafiltration membrane element after a lapse of 40 days from starting running.

In Inventive Example 4, filtration was performed for 40 minutes while adjusting a feeding pressure so as to obtain a permeate flow rate of 2.0 m$^3$/m$^2$/day in filtration. Further, the time for back wash reverse filtration was set to 30 seconds, and a feeding pressure was so adjusted as to obtain a permeate flow rate of 2.0 m$^3$/m$^2$/day in back wash reverse filtration.

[Comparative Example 1]

In comparative example 1, the spiral wound ultrafiltration membrane element was subjected to filtration and back wash reverse filtration by a running method similar to that of Inventive Example 1 except the following points, for measuring the transmembrane pressure difference of the spiral wound ultrafiltration membrane element after a lapse of 40 days from starting running.

In comparative example 1, filtration was performed for 300 minutes while adjusting a feeding pressure so as to obtain a permeate flow rate of 5.0 m$^3$/m$^2$/day in filtration. Further, the time for back wash reverse filtration was set to 60 seconds, and a feeding pressure was so adjusted as to obtain a permeate flow rate of 1.0 m$^3$/m$^2$/day in back wash reverse filtration.

[Comparative Example 2]

In comparative example 2, the spiral wound ultrafiltration membrane element was subjected to filtration and back wash reverse filtration by a running method similar to that of Inventive Example 1 except the following points, for measuring the transmembrane pressure difference of the spiral wound ultrafiltration membrane element after a lapse of 40 days from starting running.

In comparative example 2, the time for back wash reverse filtration was set to 5 seconds, and a feeding pressure was so adjusted as to obtain a permeate flow rate of 1.0 m$^3$/m$^2$/day in back wash reverse filtration.

Table 1 shows the results of measurement in Inventive Examples 1 to 4 and comparative examples 1 and 2.

TABLE 1

|  | Permeate Flow Rate in Filtration (m³/m²/day) | Filtration Time (min.) | Permeate Flow Rate in Back Wash Reverse Filtration (m³/m²/day) | Washing Time (sec.) | Ratio of Permeate V1 in Filtration to Volume V2 in Washing | Transmembrane Pressure Difference after Lapse of 40 Days (kgf/cm²) |
|---|---|---|---|---|---|---|
| Inventive Example 1 | 2.0 | 30 | 1.0 | 30 | 120 | 1.2 |
| Inventive Example 2 | 2.0 | 30 | 2.0 | 30 | 60 | 0.8 |
| Inventive Example 3 | 1.0 | 20 | 2.0 | 30 | 20 | 0.7 |
| Inventive Example 4 | 2.0 | 40 | 2.0 | 30 | 80 | 1.0 |
| Comparative Example 1 | 5.0 | 300 | 1.0 | 60 | 1500 | 2.8 |
| Comparative Example 2 | 2.0 | 30 | 1.0 | 5 | 720 | 2.8 |

As understood from the results of Inventive Examples 1 to 4, a load applied to the separation membranes 2 is reduced and contaminants adhering to the membrane surfaces can be reliably removed when the ratio $V_1/V_2$ of the permeate volume $V_1$ in filtration to the permeate volume $V_2$ in back wash reverse filtration is not more than 600, whereby change of the transmembrane pressure difference is small. Thus, stable running can be performed continuously over a long period with high filtration efficiency. Particularly when the ratio $V_1/V_2$ is not more than 240 as in Inventive Examples 1 to 4, more stable running can be performed continuously over a long period.

When the ratio $V_1/V_2$ exceeds 600 as shown in comparative examples 1 and 2, i.e., in comparative example 1 resulting in application of a large load on the separation membranes due to the excessive permeate volume $V_1$ in filtration and comparative example 2 allowing no sufficient back wash reverse filtration due to the small permeate volume $V_2$ in back wash reverse filtration, contaminants are deposited on the membrane surfaces to increase the transmembrane pressure difference, and hence it is difficult to perform stable running continuously over a long period.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising steps of:

feeding a raw liquid from an end of said spiral wound membrane element and taking out a permeated liquid from at least one opening end of said perforated hollow pipe in running;

introducing a washing liquid from at least one opening end of said perforated hollow pipe and discharging the washing liquid from at least one end of said spiral wound membrane element thereby performing back wash reverse filtration on said separation membrane with a back pressure higher than 0.05 MPa and not more than 0.3 MPa in washing; and setting the ratio of the amount of the permeated liquid permeated through said separation membrane in a running period to the amount of the washing liquid permeated through said separation membrane in a washing period to not more than 600.

2. The method of running a spiral wound membrane element according to claim 1, wherein said step of performing back wash reverse filtration includes employing a permeated liquid as said washing liquid.

3. The method of running a spiral wound membrane element according to claim 1, wherein said step of feeding a raw liquid includes feeding a raw liquid so that the flow rate of a permeated liquid in filtration is at least 0.5 m³/m²/day and not more than 4.0 m³/m²/day while setting the filtration time to at least 10 minutes and not more than 300 minutes.

4. The method of running a spiral wound membrane element according to claim 1, wherein said step of feeding a raw liquid includes feeding a raw liquid so that the flow rate of a permeated liquid in filtration is at least 0.5 m³/m²/day and not more than 2.0 m³/m²/day while setting the filtration time to at least 10 minutes and not more than 60 minutes.

5. The method of running a spiral wound membrane element according to claim 1, wherein said step of feeding a raw liquid includes feeding a raw liquid so that the flow rate of a permeated liquid in filtration is at least 0.5 m³/m²/day and not more than 2.0 m³/m²/day while setting the filtration time to at least 10 minutes and not more than 30 minutes.

6. The method of running a spiral wound membrane element according to claim 1, wherein said step of performing back wash reverse filtration includes introducing a washing liquid into said perforated hollow pipe so that the flow rate of the washing liquid in washing is at least 1.0 m³/m²/day and not more than 4.0 m³/m²/day while setting the washing time to at least 10 seconds and not more than 300 seconds.

7. The method of running a spiral wound membrane element according to claim 1, wherein said step of performing back wash reverse filtration includes introducing a washing liquid into said perforated hollow pipe so that the flow rate of the washing liquid in washing is at least 1.0 m³/m²/day and not more than 3.0 m³/m²/day while setting the washing time to at least 30 seconds and not more than 60 seconds.

8. The method of running a spiral wound membrane element according to claim 1, wherein
said separation membrane is formed by bonding a permeable membrane body to a surface of a porous sheet member, and said permeable membrane body is bonded to said surface of said porous sheet member in an anchored state.

9. The method of running a spiral wound membrane element according to claim 1, wherein
back pressure strength of said separation membrane is at least 0.2 MPa.

10. The method of running a spiral wound membrane element according to claim 8, wherein
said porous sheet member is made of woven fabric, nonwoven fabric, a mesh net or a foaming sintered sheet of synthetic resin.

11. The method of running a spiral wound membrane element according to claim 8, wherein
said porous sheet member is made of nonwoven fabric having a thickness of at least 0.08 mm and not more than 0.15 mm and density of at least 0.5 g/cm³ and not more than 0.8 g/cm³.

12. A method of washing a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising steps of:
taking out a permeated liquid by filtration and thereafter introducing a washing liquid from at least one opening end of said perforated hollow pipe and discharging the washing liquid from at least one end of said spiral wound membrane element thereby performing back wash reverse filtration on said separation membrane with a back pressure higher than 0.05 MPa and not more than 0.3 MPa; and
setting the ratio of the amount of the permeated liquid permeated through said separation membrane in filtration to the amount of the washing liquid permeated through said separation membrane in washing to not more than 600.

13. A method of running a spiral wound membrane module, comprising a pressure vessel having a raw liquid inlet and one or a plurality of spiral wound membrane elements stored in said pressure vessel, each spiral wound membrane element comprising a perforated hollow pipe and an envelope separation membrane wound on the outer peripheral surface of said perforated hollow pipe and allowing back wash reverse filtration with a back pressure higher than 0.05 MPa and not more than 0.3 MPa, comprising steps of:
feeding a raw liquid from an end of said spiral wound membrane element through said raw liquid inlet of said pressure vessel and taking out a permeated liquid from at least one opening end of said perforated hollow pipe in running;
introducing a washing liquid from at least one opening end of said perforated hollow pipe and discharging the washing liquid from at least one end of said spiral wound membrane element for taking out the washing liquid from said pressure vessel in washing thereby performing back wash reverse filtration on said separation membrane with a back pressure higher than 0.05 MPa and not more than 0.3 MPa; and
setting the ratio of the amount of the permeated liquid permeated through said separation membrane in a running period to the amount of the washing liquid permeated through said separation membrane in a washing period to not more than 600.

14. The method of running a spiral wound membrane module according to claim 13, wherein
said step of performing back wash reverse filtration includes employing a permeated liquid as said washing liquid.

15. The method of running a spiral wound membrane module according to claim 13, wherein
said step of feeding a raw liquid includes feeding a raw liquid so that the flow rate of a permeated liquid in filtration is at least 0.5 m³/m²/day and not more than 4.0 m³/m²/day while setting the filtration time to at least 10 minutes and not more than 300 minutes.

16. The method of running a spiral wound membrane module according to claim 13, wherein
said step of feeding a raw liquid includes feeding a raw liquid so that the flow rate of a permeated liquid in filtration is at least 0.5 m³/m²/day and not more than 2.0 m³/m²/day while setting the filtration time to at least 10 minutes and not more than 60 minutes.

17. The method of running a spiral wound membrane module according to claim 13, wherein
said step of feeding a raw liquid includes feeding a raw liquid so that the flow rate of a permeated liquid in filtration is at least 0.5 m³/m²/day and not more than 2.0 m³/m²/day while setting the filtration time to at least 10 minutes and not more than 30 minutes.

18. The method of running a spiral wound membrane module according to claim 13, wherein
said step of performing back wash reverse filtration includes introducing a washing liquid into said perforated hollow pipe so that the flow rate of the washing liquid in washing is at least 1.0 m³/m²/day and not more than 4.0 m³/m²/day while setting the washing time to at least 10 seconds and not more than 300 seconds.

19. The method of running a spiral wound membrane module according to claim 13, wherein
said step of performing back wash reverse filtration includes introducing a washing liquid into said perforated hollow pipe so that the flow rate of the washing liquid in washing is at least 1.0 m³/m²/day and not more than 3.0 m³/m²/day while setting the washing time to at least 30 seconds and not more than 60 seconds.

20. The method of running a spiral wound membrane module according to claim 13, wherein
said separation membrane is formed by bonding a permeable membrane body to a surface of a porous sheet member, and said permeable membrane body is bonded to said surface of said porous sheet member in an anchored state.

21. The method of running a spiral wound membrane module according to claim 13, wherein
back pressure strength of said separation membrane is at least 0.2 MPa.

22. A method of washing a spiral wound membrane module, comprising a pressure vessel and one or a plurality of spiral wound membrane elements stored in said pressure vessel, each spiral wound membrane element comprising a perforated hollow pipe and an envelope separation membrane wound on the outer peripheral surface of said perforated hollow pipe and allowing back wash reverse filtration with a back pressure higher than 0.05 MPa and not more than 0.3 MPa, comprising steps of:

taking out a permeated liquid by filtration and thereafter introducing a washing liquid from at least one opening end of said perforated hollow pipe and discharging the washing liquid from at least one end of said spiral wound membrane element for taking out the washing liquid from said pressure vessel thereby performing back wash reverse filtration on said separation membrane with a back pressure higher than 0.05 MPa and not more than 0.3 MPa; and setting the ratio of the amount of the permeated liquid permeated through said separation membrane in filtration to the amount of the washing liquid permeated through said separation membrane in washing to not more than 600.

* * * * *